United States Patent [19]
Zabolotny et al.

[11] 3,793,171
[45] Feb. 19, 1974

[54] PROCESS FOR REMOVING POLLUTANTS FROM GAS STREAMS

[75] Inventors: Ernest R. Zabolotny, Syracuse; Wendell J. Biermann, Fayetteville; Peter L. Chang, Syracuse, all of N.Y.

[73] Assignee: Carrier Corporation, Syracuse, N.J.

[22] Filed: Sept. 4, 1970

[21] Appl. No.: 69,804

[52] U.S. Cl. ............................................. 204/130
[51] Int. Cl. ............................................. C01d 7/34
[58] Field of Search ........................... 204/130, 136

[56] References Cited
UNITED STATES PATENTS

| | | | |
|---|---|---|---|
| 2,046,467 | 7/1936 | Krause | 204/149 |
| 1,034,646 | 8/1912 | Rabenalt | 204/130 |
| 996,705 | 7/1911 | Cross | 204/130 |
| 3,401,101 | 9/1968 | Keller | 204/136 |

FOREIGN PATENTS OR APPLICATIONS

| | | | |
|---|---|---|---|
| 682,411 | 3/1964 | Canada | 204/130 |
| 1,318,437 | 7/1963 | France | 204/130 |

OTHER PUBLICATIONS
Comprehensive Treatise on Inorganic & Theoretical Chem., by Mellor, Vol. 14, 1935, pages 790–791.

*Primary Examiner*—Howard S. Williams
*Assistant Examiner*—R. L. Andrews
*Attorney, Agent, or Firm*—Sughrue, Rothwell, Mion, Zinn & Macpeak

[57] ABSTRACT

A process for removing oxidizable impurities from "waste" gas streams which comprises contacting the gas stream, typically air, which carries the oxidizable impurities with an aqueous acid stream containing an electrolytically regenerable oxidizing agent. After a sufficient contact time to remove oxidizable impurities from the gas stream, the gas stream is removed from the contact area with a lowered impurity content and vented or further treated as desired, the aqueous acid stream containing the electrolytically regenerable oxidizing agent and oxidizable impurities is removed from the contact area, the electrolytically regenerable oxidizing agent is regenerated, and the above described cycle is repeated. Preferably, the regenerable metal oxidizing agent is cobalt in the +3 valence state and the aqueous stream contains sulfuric acid. Destruction of oxidizable impurities is continuous throughout the system, i.e., in the mass transfer contact area, the electrolytic regeneration area and in all process interconnections.

Apparatus in accordance with the present invention comprises a contact area for mass transfer between the acid stream containing the electrolytically regenerable oxidizing agent and the gas stream containing the oxidizable impurities and electrolytic means for regenerating the electrolytically regenerable oxidizing agent.

38 Claims, 2 Drawing Figures

PROCESS FOR REMOVING POLLUTANTS FROM GAS STREAMS

BACKGROUND OF THE INVENTION

1. Field of the Invention

The present invention relates to a process and apparatus for removing and destroying oxidizable impurities from gas streams, preferably air streams, by contacting the gas stream with an aqueous acid stream containing an electrolytically regenerable oxidizing agent.

2. Description of the Prior Art

Processes are known in the prior art wherein metals are utilized as true catalysts to catalytically oxidize small amounts of gaseous hydrocarbons which are carried in air. For instance, in U.S. Pat. No. 1,422,211, and in British Patent 983,372, cobaltous oxides are disclosed as performing such a function. However, the processes disclosed involved elevated temperatures, which makes operation difficult and requires expensive and costly heating and/or cooling steps, before and after treatment, respectively.

In U.S. Pat. No. 2,926,999, a process is disclosed for the recovery of sulfur dioxide from a waste gas. The process disclosed comprises first adding ozone to a gaseous mixture containing a small proportion of sulfur dioxide and passing the resultant gaseous mixture up through a packed absorption tower while passing a liquid absorption medium comprising an aqueous solution of manganese ion and sulfuric acid down over the packing. A liquid effluent high in sulfate ion content is withdrawn from the lower part of the tower. There is no disclosure of regeneration of any type, nor is it clear that a commercially useful process could be obtained at ambient temperatures without zone promotion.

U.S. Pat. No. 3,318,662 discloses a sulfur dioxide separation process. Carbonaceous substances are used as catalytic materials, and the activity of the carbonaceous substances used in catalyzing the reaction of sulfur dioxide to sulfuric acid is promoted by adding a metal, such as cobalt, to the reaction medium. Temperatrue of operation is in the area of 20°-80°C., but the metal, such as cobalt, is always used in the supported form, i.e., where a wet adsorption is performed, a trickle or spray of water to extract sulfuric acid is performed onto the solid absorbant. Since the oxidation process occurs entirely at a solid/liquid interface, gases must be diffused through the water to the adsorbant, and such a process is necessarily limited by the surface area presented by the adsorbant.

U.S. Pat. No. 3,383,164 discloses a process for removing carbon monoxide from gas streams by a catalytically activated mechanism. The active catalyst used is in the form of silver ions in combination with permanganate ions. Sulfuric acid is the disclosed solvent. In this type of operation, the permanganate ions are easily reacted to manganese dioxide, a brownish silt which must be constantly removed or else subjected to further chemical reaction.

U.S. Pat. No. 3,459,495 discloses the use of an aqueous solution of a catalytic compound having a set oxidation-reduction potential. The catalytic material is utilized to desulfurize gas streams containing hydrogen sulfide. Typically used in an aqueous alkaline solution, the active organic "catalyst," which is a quinone-type compound, can be continuously oxidized in the contact area.

A process occasionally used in the removal of pollutants includes the use of alkaline permanganate in an air washer. While this process is of some value in removing pollutants from an air stream, it possesses numerous disadvantages. One disadvantage is the fact that the oxidation or treatment must be in an alkaline solution which, upon contact with an air stream, becomes acidic because of the absorption of carbon dioxide. A second disadvantage is the fact that manganese dioxide is frequently the product of the reactions which take place in the solution, and the presence of manganese dioxide effectively renders the process non-regenerable. A final disadvantage is the fact that pollutants oxidized by an alkaline permanganate, such as potassium permanganate, would normally result in oxidation products which are themselves objectionable molecules instead of being oxidized to harmless gases such as carbon dioxide.

SUMMARY OF THE INVENTION

The present invention provides a process for removing oxidizable impurities carried in a gas stream, such as an air stream, by contacting the gas stream containing the oxidizable impurities with an aqueous acid stream containing an electrolytically regenerable oxidizing agent in a contact zone and electrolytically regenerating the oxidizing agent.

Hereinafter, the oxidizable impurities will also be referred to as pollutant and/or odorous materials.

The oxidizing agent should have a high oxidation potential, exhibit a rapid reaction with pollutants, and should be capable of rapid and efficient electrolytic regeneration.

The purpose of contacting the gas stream and the aqueous acid stream carrying the electrolytically regenerable oxidizing agent is to insure good mass transfer between the gas stream and the electrolytically regenerable oxidizing agent, i.e., to bring the pollutants into contact with the electrolytically regenerable oxidizing agent.

Destruction of pollutant or odorous materials will actually occur all throughout the pollution control system of this invention due to the continuing contact between the aqueous acid-electrolytically regenerable oxidizing agent stream and the pollutants. Destruction of pollutants also occurs at the electrodes of the electrolytic regeneration apparatus.

After gas-liquid contact the "cleansed" gas stream is removed from the contact zone and vented. The to the atmosphere or containing the electrolytically regenerable oxidizing agent is also removed from the contact zone and electrolytically regenerated. Regeneration is from a lower valence state to a higher valence state. The electrolytically regenerable oxidizing agent is then recycled to the contact area.

The most preferred electrolytically regenerable oxidizing agent is cobalt in the +3 valence state. Cobalt (III), carried in a highly acidic aqueous stream, has proven to have both the capability of rapid reaction with pollutants and to be satisfactorily stable for commercial usage when used at appropriate acid concentrations. Further, cobalt in the lower valence state [CO(II)], may be easily regenerated without the addition of chemicals, by electrolytic means, to the Co(III) state.

Apparatus in accordance with the present invention comprises mass transfer contact means for the aqueous acid stream containing the electrolytically regenerable oxidizing agent and the waste gas stream containing pollutant or odorous impurities, and electrolytic regeneration means for restoring the aqueous acid stream, which becomes reduced in oxidation capability by the destruction of pollutant or odorous materials, to its original oxidizing state.

It is thus one object of the present invention to provide an improved process and apparatus for removing oxidizable impurities carried in a gas stream.

It is another object of the present invention to provide a process and apparatus for removing pollutant and odorous impurities from air streams.

Yet a further object of the present invention is to provide a continuous process and apparatus for removing oxidizable impurities in a gaseous stream provided with means for regenerating an electrolytically regenerable oxidizing agent carried in an aqueous acid stream utilized for the removal procedure.

It is a further object of the present invention to provide a process and apparatus for removing oxidizable impurities in a gas stream by means of a solution of cobalt in the +3 valence state carried in an aqueous acid stream, the acid preferably being sulfuric acid, wherein electrolytic regeneration means for converting cobalt in the +2 state to cobalt in the +3 state is provided, thereby constantly regenerating the aqueous acid stream containing the regenerable metal oxidizing agent.

It is still a further object of the present invention to provide a process and apparatus for oxidizing impurities in a gas stream wherein destruction of impurities occurs not only due to an electrolytically regenerable oxidizing agent, but also at the electrodes of an electrolytic regeneration apparatus.

These and other objects of the present invention will be described in greater detail in the following portions of the application.

DETAILED DESCRIPTION OF THE PREFERRED EMBODIMENTS

Figure 1:
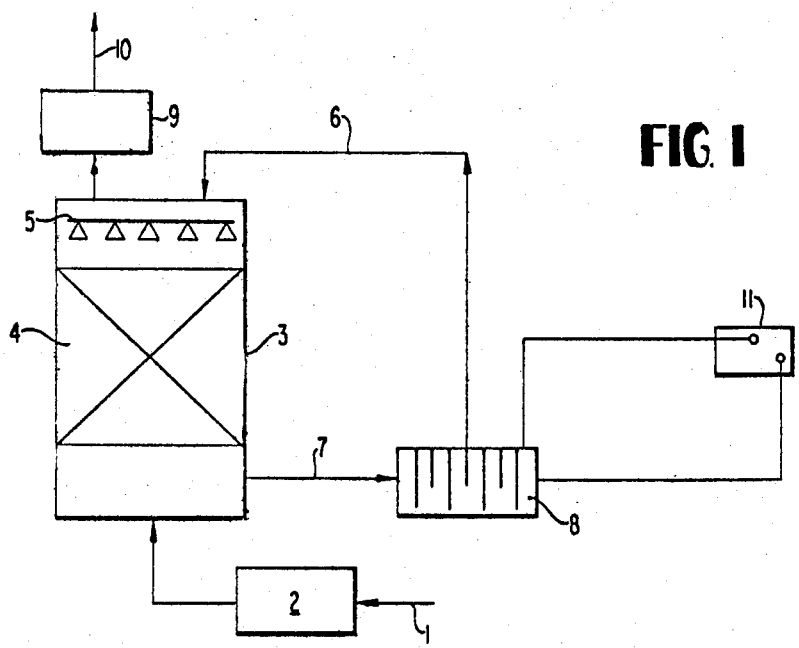
FIG. 1 represents a schematic flow diagram of a representative pollution control process in accordance with the present invention.

From its broadest aspect, the present invention comprises continuously removing oxidizable odorous or pollutant materials from a gas stream, such as air, by contacting or scrubbing the odorous materials from the gas stream containing those materials (hereinafter called simply the waste stream or gas stream) with an aqueous acid solution of an electrolytically regenerable oxidizing agent.

The actual contact process can be performed in any state of the art apparatus which provides satisfactory gas-liquid mass transfer (and which is resistant to the aqueous acid stream) between the waste stream and the aqueous acid stream containing the electrolytically regenerable oxidizing agent (hereinafter the aqueous acid stream which always contains the electrolytically regenerable oxidizing agent is simply termed the "acid stream").

During the period of contact, many pollutant or odorous materials are adsorbed or absorbed by the acid stream and, by a continuous process which occurs throughout the complete system of the present invention, are oxidized by the acid stream.

The waste stream, purified of odorous and pollutant materials, can be removed from the contact area and passed to the atmosphere or recirculated into the area from which the waste stream is derived.

The acid stream, which will tend to become depleted in oxidizing capability during the oxidation of the odorous or pollutant materials, is removed from the contact area and electrolytically regenerated. The "regenerated" acid stream is thereafter recycled for further utilization.

In general terms, the process of the present invention thus comprises:

1. contacting a gaseous waste stream with a liquid acid stream for a period of time sufficient to remove the desired amount of odorous or pollutant materials in the waste stream by gas/liquid mass transfer; and 2. removing and electrolytically regenerating the acid stream for further treatment of additional amounts of the waste stream.

The purpose of contacting the gas stream and the acid stream is to insure satisfactory mass transfer between the gas stream and the electrolytically regenerable oxidizing agent i.e., to bring the pollutants into contact with the electrolytically regenerable oxidizing agent. Destruction of pollutant or odorous materials will actually occur all throughout the pollution control system of this invention due to the continuing contact between the aqueous acid electrolytically regenerable oxidizing agent stream and the pollutants. Destruction of pollutants also occurs at the electrodes of the electrolytic regeneration apparatus.

In the above process, one of the most important process aspects is the use of an electrolytically regenerable oxidizing agent. Before entering into a discussion of this term, it is appropriate to clearly delineate the differences between a catalytic material, often used in prior art pollution control processes, and an electrolytically regenerable oxidizing agent as is used in the present invention.

Firstly, a catalyst, as is known to the prior art, is used to initiate, or lower the energy of activation, of a spontaneous process, e.g., a process which will take place, though slowly, without the presence of a catalyst.

In contradistinction, an oxidizing agent, as is used in the present invention, causes a non-spontaneous process to occur, and basically serves as a means of energy transfer, i.e., in non-chemical terms, the electrical energy introduced into the system during electrolytic regeneration is "transferred" to the pollutant materials during the oxidation process by the oxidizing agent.

Thus, in the present invention, the term electrolytically regenerable oxidizing agent includes only those oxidizing agents which can accept electrons during the pollutant destruction process and which can be restored to their original "oxidizing" or electron acceptive form by simple electrolytic regeneration.

In the preferred form of the present invention the term electrolytically regenerable oxidizing agent is meant to define a metal ion which is capable of accepting electrons during the pollutant destruction process and yielding electrons during electrolytic regeneration. Such a metal in ionic form can be derived from a metal which is capable of exhibiting at least two different ionic valence states, such as, for example, Co(III)/(II), Cr(VI)/(III), Mn(III)/(II), Ag(II)/(I), Ce(IV)/(III).

The following discussion will deal with such preferred electrolytically regenerable oxidizing agents which will be termed an electrolytically regenerable metal oxidizing agent. It is believed that most regenerable metals in ionic form quite often exist as some type of complex in the acid stream. In the following discussion, these complexes will be treated as though they exist in the simple ionic form, since, for all practical purposes such is sufficient to fully appreciate the present invention. However, no matter what species of the metal in ionic form is present in the acid stream, it must always be capable of accepting electrons from a pollutant or odorous impurity and must always be capable of subsequently being regenerated to its original electron acceptive form by electrolytic means, i.e., the regenerable metal oxidizing agent must be capable of existing in the form of a high valence/low valence ionic couple.

The electrolytically regenerable metal oxidizing agent is preferably used in the form of a salt solution in water. The electrolytically regenerable metal oxidizing agent in its higher or elevated valence state must meet the following criteria. First, it must exhibit a sufficiently high oxidation potential to accept electrons from common odorous materials. Further, the electrolytically regenerable metal oxidizing agent must be electrolytically regenerable from a lower valence state to a higher valence state. Most importantly, the electrolytically regenerable metal oxidizing agent must be capable of efficiently oxidizing and destroying many common air pollutants or odorous materials and must not decompose too rapidly at the process conditions.

One metal in ionic form which meets all of the above requirements and which has been found to function better than any other known electrolytically regenerable metal oxidizing agent is cobalt in the +3 valence state (hereinafter Co(III)). Co(III) is one of the best and most conveniently electrolytically regenerated metal oxidizing agents. Co(III) meets each of the three criteria posed for the electrolytically regenerable metal oxidizing agent set forth above, i.e., a high oxidation potential to accept electrons from common odorous materials, it is regenerable electrolytically from a lower to a higher valence state, and it can efficiently destroy many common air pollutants without decomposing too rapidly at process conditions.

Co(III), which is reduced to Co(II) during oxidation, has been found to destroy a wider variety of pollutants than any other electrolytically regenerable metallic oxidizing agent, so much better, in fact, that the difference can be considered almost one of kind and not of degree. However, it shall be understood that the invention is not limited to Co(III), though this material is by far most preferred, but can include other elements which meet the above cited requirements, such as, chromium, manganese, silver, cerium.

These latter elements are subject to certain limitations, for instance, although silver is highly reactive, it is difficult to electrolytically regenerate with satisfactory efficiency. On the other hand, while chromium and manganese can be regenerated with adequate efficiency, for instance, $Cr^{+3}$ to $Cr_2O_7^=$, the active species of chromium and manganese exhibit slower oxidizing rates than the Co(III)/Co(II) couple. Further, manganese quite often will lead to the formation of manganese dioxide, which cannot be electrolytically regenerated in a commercial manner. Cerium, on the other hand, requires an elevated temperature to be of general application (around 80° C) or else it also exhibits a slow oxidizing rate. However, it must be understood that while the above materials may not have the general applicability which Co(III) will have, for certain applications each of the above will serve excellently in the process of the present invention. For instance, for more easily oxidizable materials, Cr and Mn may often provide a completely adequate rate of pollutant destruction. Where the waste stream, as in some applications, is itself at elevated temperature, cerium might even be preferred over cobalt. Where the ease of electrolytic regeneration is a secondary consideration to the reactiveness of the oxidizing agent, one might select silver as the oxidizing agent. Each of the above four representative electrolytically regenerable oxidizing agents should also be used in an acidic medium.

Perhaps the most important reason for using cobalt is that the Co(III)/Co(II) couple has been found to be of almost general application in destroying or oxidizing many odorous or pollutant materials encountered in waste air streams. Further, it has been found that acidic aqueous streams comprising the Co(III)/Co(II) couple can be electrolytically regenerated in accordance with the process of this invention with extreme ease, thereby providing an overall oxidation/regeneration cycle of wide application for the reduction of pollutant emissions.

In addition to a regenerable metal oxidizing agent, the present process requires an aqueous acidic stream as a "carrier" for the electrolytically regenerable metal oxidizing agent.

An aqueous acidic stream is required in the present invention for the following reasons. An aqueous acidic stream is required for electrolytic regeneration. A totally aqueous stream, i.e., with a neutral pH, could not function as the carrier stream of the present invention. The electrolytically regenerable metal oxidizing agents of the present invention are, for practical usage, unsatisfactory in a neutral or basic medium, because the oxidation capability of cobalt, chromium, manganese and silver will be destroyed for practical commercial usage unless the carrier stream is acidic. A further advantage of the use of an aqueous acid system is that exposure to carbon dioxide is not harmful to the system.

By the term "acidic," in the context of this application, is generally meant an aqueous stream at a pH less than one. Such a stream can be obtained by adding inorganic or organic acids, preferably inorganic acids, to an aqueous stream containing the electrolytically regenerable metal oxidizing agent. However, the acid which is used must meet several very important criteria. Firstly, the acid itself must not be irreversably altered by the regenerable metal oxidizing agent. Specifically, the acid itself must not be destroyed, that is, converted to such a state that it could not be regenerated to the acid originally present in the system which can provide a pH less than one to the system. Further, the acid itself must not excessively consume the electrolytically regenerable oxidizing agent though, as will be apparent from the fact of continuous regeneration of the oxidizing agent, some consumption is permissible. It is also most desirable that the acid have a vapor pressure which is low enough to avoid excessive vaporization at process conditions. Finally, the acid must be water soluble. As long as the above criteria are met, any acid can be used. The above criteria are very important in the case of using Co(III) since this material is such a powerful electrolytically regenerable metal oxidizing agent.

In view of the above criteria, sulfuric acid and phosphoric acid have been found to be most preferred in the present invention.

A further advantage of the use of sulfuric acid or phosphoric acid is that the moisture content in the acid stream will adjust itself to the moisture content in the air. This may be termed the "humectant" capability of sulfuric and phosphoric acid. Essentially, this means that the acid stream can contain variable quantities of water in equilibrium with ambient air which, of course, will contain variable quantities of water depending upon the ambient conditions. Practically speaking, if a "humectant" type acid stream is in contact with air having a higher water content than the amount of water which would be in equilibrium with the acid stream, the acid stream will abstract water from the air until the water content of the "humectant" acid stream is in equilibrium with the water in the air. The converse is also true, i.e., if the "humectant" acid stream contains more water than would be in equilibrium with the water in the ambient air, the "humectant" acid stream will lose water until it is again in equilibrium with the air. This advantage of using sulfuric or phosphoric acid is extremely valuable because it will then not generally be necessary to add water to the acid stream of the present invention to maintain a sufficiently high water content, or to remove water to maintain a workable acid concentration.

The addition of water is undesirable in the present process for purely practical reasons, that is, it is necessary to purify water before adding water to the system of this invention, a rather expensive process which must be followed or mineral scale will build up. Water is required in the present process because it is consumed during the pollutant destruction process. Specifically, water is the primary source of oxygen for the oxidation products in the present process. Thus, water from some source will always be required to supply water destroyed to yield oxygen during the oxidation. The "humectant" properties of sulfuric acid and phosphoric acid thus provide an inherent control of water content.

While sulfuric acid is most preferred, with phosphoric acid a secondary choice and perchloric acid alone or mixtures thereof with sulfuric or phosphoric being a tertiary choice, other acids can be used in combination with sulfuric acid, and phosphoric acid, perchloric acid or mixtures thereof. Further, the corresponding water-soluble acid salts of sulfuric acid, phosphoric acid, and mixtures thereof may be completely substituted for the corresponding acids. Generally speaking, the corresponding water-soluble acid salt, if such exists, of any acid operable in the present invention may be substituted therefor. Representative of such salts are sodium bisulfate, potassium and lithium dihydrogen phosphate, etc., and mixtures thereof. Obviously, acid/acid salt mixtures may be used. Although non-preferred, small amounts of acids such as nitric, boric or chromic acid can be present without detriment.

Salts are generally non-harmful to the acid system, and salts such as potassium borate, ammonium persulfate, calcium nitrate, potassium phosphate, magnesium perchlorate, manganous nitrate and chromium nitrate can be added to the system in small amounts without interferring with the functioning of the acid stream. It will be obvious that small amounts of bases can even be used in the acid stream, so long as they do not destroy the essential characteristics of the acid stream.

It will be understood, of course, that the general principles discussed in the following material with respect to the Co(III) embodiment apply with equal force to all electrolytically regenerable oxidizing agents of the present invention.

For the Co(III)/Co(II) system the acid concentration used in the present invention must, of course, be at a pH less than one. Generally, for the Co(III)/sulfuric acid system, the acid concentration must be within the range of about 0.1N to about 27.5N, with a preferred range being 10N–14N. If operation is at an acidity much less 0.1N, the presence of Co(III) as a useful oxidizing agent is not detectable. 27.5N is set as an upper limit in view of the fact that electrolytic regeneration requires a normality lesser than 27.5N for current passage.

It is now appropriate to discuss what is meant by the terminology "waste stream." It should be understood that the present invention is of wide application, that is, the present process can be used to remove many common odorous or pollutant material which can be oxidized. It will be apparent that some materials are more easily oxidized than others. However, the complete destruction of materials which are somewhat more difficult to oxidize is a matter of degree and not of kind.

It can be said that there is an approximate, though rough, degree of correlation between the solubility of the pollutant material in the acid stream and the rate of destruction thereof. It is theorized this is based on the fact that the regenerable metal oxidizing agent provides maximum oxidation when it is intimately contacted with the pollutant to be destroyed i.e., when mass transfer of pollutants to the acid stream occurs. However, it is believed that not only will destruction of pollutants occur via mass transfer of the pollutants into the "interior" of the acid stream, but that some destruction of pollutant materials occurs through "impaction," that is, some destruction will even occur of pollutant materials which are rather insoluble in the acid stream and which essentially "impact" themselves into the surface of the acid stream. These two types of pollutant destruction can be viewed as homogeneous oxidation (within the acid stream) and heterogeneous oxidation (at the surface of the acid stream).

Accordingly, those materials which are easily soluble in the acid stream will be more readily destroyed both by a surface effect (heterogeneous) and in the interior (homogeneous) of the acid stream containing the oxidizing agent. However, it is well known that every material is at least soluble to some extent in water. Thus, as long as a material exhibits any solubility, "interior" or "homogeneous" oxidation thereof to a certain extent will occur. If a highly non-soluble material is present it is probable that very little destruction of this non-soluble material will occur except through "surface" or "heterogeneous" oxidation.

Obviously, materials which are highly insoluble but have a very low vapor pressure can be retained in the system easily for extensive amounts of time, thereby permitting a slow but continually progressing "heterogeneous" oxidation process. For instance, fats would be of this latter type.

Thus, in view of the above discussion, it will be clear that speaking in general terms, an oxidizable compound which is highly soluble in water can be rapidly oxidized, whereas a compound highly insoluble will be slowly oxidized. Compounds intermediate in solubility, i.e., those which are between the extremes of complete solubility and complete insolubility, can generally be "predicted" to oxidize at some intermediate rate.

It is appropriate to indicate at this time that while no complete accurate prediction can be made as to oxidation rate, generally, materials of the same type are oxidized in a similar manner. For instance, the oxidation of a simple ketone such as acetone will enable one to predict with some degree of success the behavior of more complicated ketones, the oxidation of a simple aldehyde such as formaldehyde will enable the behavior of more complicated aldehydes to be predicted, etc. While individual exceptions may be noted, for instances, acetic acid oxidizes at a slow rate in the acid stream, the above correlations provide an easy basis to make an initial determination of the process equipment required.

While any compound which can be oxidized is amenable to treatment in the process of this invention, organic compounds which contain oxygen, sulfur, nitrogen, phosphorous, selenium, etc. are usually oxidized at an extremely fast rate. Compounds which are generally considered very slowly oxidizable are, with the Co(III) system, rapidly oxidized. For instance, the following materials are generally speaking among the more common pollutants which have very strong odors and which are effectively treated in the present process: Alcohols of all types; ketones of all types; aldehydes of all types; carboxylic acids of all types with a soewhat slower oxidation rate for acetic acid; amines of all types including primary, secondary and tertiary amines; esters of all types; ethers of all types, with a rough correlation to solubility. Aliphatic, aromatic and halogenated hydrocarbons are not as effectively treated in the process.

In addition to the organic compounds listed, the same criteria apply to inorganic compounds. One of the most commonly encountered inorganic compounds easily oxidized in accordance with the present invention is sulfur dioxide.

To provide just a partial listing of commonly encountered odorous materials in waste streams, the following materials can be destroyed: acetone, formaldehyde, formic acid, pyridine, acrolein, hydrogen sulfide, methylamine, allyl alcohol, tetrahydrofuran, methyl isobutyl ketone, acetophenone, acetic acid, iso-valeric acid, aniline, isobutylamine, hydrogen thiocyanate, octyl thiocyanate, carbon disulfide, formaldehyde and acetonitrile.

The above listing is not complete, and is meant to provide merely an indication of the vastly varying types of materials which can be oxidized in accordance with the present invention.

From the above discussion, it will be clear that one of the most important factors to consider in treating a particular waste stream is the oxidation rate of a particular compound by the electrolytically regenerable metal oxidizing agent. As indicated above, generally speaking, the more soluble a compound is, the more rapidly it will be oxidized. Further, and equally as important as solubility, pollutant impurities which are good reducing agents will generally be more rapidly oxidized by any reasonably strong electrolytically regenerable metal oxidizing agent than a pollutant compound which is a weak reducing agent. Again, this will be a matter of degree, and the above correlation is relative with respect to the pollutant compounds being oxidized.

Having thus described the acid stream and waste stream, it is appropriate to now indicate how one skilled in the art may "tailor" the pollution control system of this invention to any particular waste stream. The material below generally provides, in sequential order, an explanation of the principle of dynamic equilibrium, a general discussion of the determination of the amount of Co(III) one must produce for a particular waste stream, and a specific example of how one would "size" an industrial pollution control system in accordance with the present invention.

Generally speaking, large amounts of a rapidly oxidized impurity can be consumed with smaller overall process units, though an adequate regeneration cell is required, while larger overall process units will be required to treat a slowly oxidized impurity. For complex mixtures, of course, the apparatus requirements will be somewhere between those required for the above extremes.

It will be apparent that the terms "rapidly oxidized" and "slowly oxidized," as used above, are relative terms. This is because of the principle of dynamic equilibrium. Cobalt (III) which is produced will preferably be in dynamic equilibrium, that is, Co(III) will be produced at a rate as close as possible to the rate at which Co(III) is consumed by the pollutants.

At the same time, the pollutants will also be in a state of dynamic equilibrium, that is, pollutants will be consumed in the system at a rate equal to the rate at which they are introduced into the system. From the laws of chemical kinetics, it can generally be said that most materials which are oxidized will exist in the state of equilibrium in the acid stream, that is, at process start up the concentration of any one pollutant in the acid stream would increase to a certain point, which can be termed the dynamic equilibrium value. However, once this point is reached it will (assuming process conditions are not changed) not be exceeded, but rather, further pollutant impurities which are introduced into the system will be consumed so that there is a balance of the amount of any one impurity introduced versus the amount of that impurity which is consumed.

For an impurity which is rapidly oxidized, the dynamic equilibrium value will be low in terms of the absolute amount of that impurity which is carried in the system. On the other hand, for an impurity which is slowly oxidized, the dynamic equilibrium value will be large in terms of the absolute amount of that impurity which is carried in the system.

It will be noted that the above statements are in terms of the amount of Co(III) produced, and not in terms of the absolute amount of Co(III) present at any one point in the system. The reasons for this are two-fold. Since oxidation of a multi-component pollutant load generally occurs at every point throughout the system, the Co(III) concentration is continually decreasing (with the exception of the actual process of electrolytic regeneration per se) throughout the system due to Co(III) consumption in the oxidation process. As long as any Co(III) is detectable in the system, some pollutant materials will be oxidized. However, it will be obvious that at a high relative pollution load, unless enough Co- (III) is produced to oxidize the pollutant or odorous materials "scrubbed" from the waste stream, a buildup of pollutant materials will occur which will overload the system and lead to reduced efficiency. Little problem will be encountered in actually oxidizing the desired amount of pollutants present in any waste stream to avoid overload. This is simply done by "overdesigning" the electrolytic regeneration cell so that more Co(III) is regenerated than is necessary. However, for obvious reasons, it is not economically advisable to produce excessive amounts of Co(III) since, though such will not harm the system, one is merely expending electrical energy to regenerate Co(III) which is not being used to oxidize impurities.

Correlating the Co(III) production to any waste stream is thus a matter of degree, that is, one wishes to produce Co(III) at a rate sufficient to destroy the pollutants present in the waste stream without a substantial excess of Co(III).

The amount of Co(III) which must be produced for a given waste stream must be determined empirically, that is, by performing trial runs on the waste stream. The reason for this is that the absolute rate of oxidation of any one pollutant or odorous material by any specific electrolytically regenerable oxidizing agent cannot be predicted in advance of performing an actual oxidation.

A known volume of the waste stream can be passed into a known Co(III)/sulfuric acid stream in any mass transfer means. This is done on a bench scale. The Co(III) is continuously electrolytically regenerated at a known production rate and recycled to the mass transfer means. The off gas, i.e., the treated waste stream, is analyzed for the total pollutant or odor level. If excessive amounts of unoxidized pollutant or odorous materials are found to exit the bench scale system, the amount of Co(III) produced would be increased. The above analysis would be repeated. One would continue to increase the amount of Co(III) produced until the acceptable amount of unoxidized materials from the gas stream passes through the system. At this point, the production of further amounts of Co(III) would not be required. By the above bench-scale procedure, it is possible to determine the amount of Co(III) which must be regenerated for a given volume of waste gas.

If desired, at this time the most economical limits for process operation can also be determined. For instance, maintaining other factors constant, one can decrease the absolute amount of cobalt in the system to set a lower cobalt concentration. This is relatively unimportant since cobalt loss from the system is minimal and the only economic savings is in the initial cobalt supplied. One further may wish to vary the sulfuric acid concentration to determine the operable limits thereof. However, such is also unnecessary since little loss of sulfuric acid occurs and the concern is an effective system, not the minor variations which can easily be determined at any time.

Knowing the acid stream/waste stream flow requirements determined on the bench-scale unit, any vendor of gas-liquid contact equipment can readily establish the size of the mass transfer area required whether it be a packed bed, spray tower, trickle tower, or whatever form contemplated for an individual application.

Once the optimum contact area is set, of course, the remainder of all process flow lines can easily be determined, it merely being required that the process piping be sufficient to handle the flow rates under consideration.

Of course, the total volume of the acid stream circulating in the system of this invention must be sufficient to retain the pollutant impurities throughout the system, or process loop, for a length of time sufficient to permit the pollutant materials carried in the waste stream to be oxidized. It will be obvious that little problem with pollution buildup will be encountered throughout the process loop. The absolute amount of pollutant impurities will be at a maximum in the actual contact area, and if adequate mass transfer is achieved, thereafter, due to the continuing conversion of impurities to carbon dioxide, etc., the system will always be sufficient to contain the impurities at a satisfactory level.

Since oxidation will proceed from the moment of contacting, it will be thus apparent that dynamic equilibrium will be approached from a point immediately after the contacting and that if mass transfer is achieved, thereafter the system will always have the capability to carry the requisite amount of impuities and destroy the impurities by the continuing oxidation process.

Thus, from the data obtained, it can be seen that the contact unit and the process piping are easily scaled up. Further, from the rate of Co(III) production determined on the bench-scale unit, it is a simple matter to calculate the necessary electrolytic regeneration apparatus required. This is because the main factor which sets the size of the electrolytic regeneration apparatus is the requisite amount of Co(III) production.

Generally speaking, in designing any type of pollution control apparatus, one will wish to somewhat "overdesign" all calculated values, perhaps by a factor of 25 percent. The reasons for this are twofold: To account for any possible variations in performance upon scale up and to provide for the capability of increased waste stream flow rates.

The above "tailoring" is accomplished in the same manner for a simple waste stream or for a complex waste stream, the desired result being exactly the same in both instances, i.e., a pollutant load in the off gas lower than the final requirements of the purchaser.

The above experimental determination of the system required to treat a particular waste stream is actually the simplest way to design a system since many industrial waste streams, for instance, a waste stream from a rendering plant, contains numerous odorous or pollutant materials. By current state of the art analytical methods, it is impossible to exactly identify the odorous materials present, though such has been attempted by researchers. However, the above experimental determination method obviates the need for any complete analysis of the materials present since a determination is made entirely by means of the obtaining of the desired results, that is, a discharge gas from the system containing a pollution load lower than that required to meet the purchaser's requirements. Further, if any anomalous compounds exist in the waste stream, that is, compounds which would require a greater cobalt production rate or for some reason a greater volume of acid stream, the few process runs performed determine if such instances occur and insure a process which it is known (from the data) will oxidize such anomalous materials (if they exist).

It must be kept in mind, after reading the above material, that so long as any Co(III) can be detected, some oxidation of pollutants will occur. Thus, this will be a minimum absolute amount of Co(III) which must be present. A practical maximum amount of cobalt is at the point of the cobalt salt saturation, typically 0.1M when the sulfate salt is employed in a system where the minimum temperature is 32° F.

For the cobalt system, it is desirable that the cobalt molar concentration be greater than 0.002 molar, with 0.005 molar forming a minimum feasible concentration for most commercial operation. During operation, Co(III) will always be present with Co(II) in the system, and the amount of the Co(III) will preferably range from about 5 to 20 percent of the amount of Co(II). It is apparent that this amount will vary depending upon the rate of pollutant destruction, the regeneration efficiency, the amount of total cobalt expressed as either Co(III) or Co(II) in the system, and that this 5–20 percent range is non-limiting and merely representative.

In short, the primary criterion which must be met is that the pollutant or odorous material which is to be oxidized must be adequately contacted with the regenerable metal oxidizing agent for a time sufficient to destroy the same, generally to carbon dioxide and water.

Having thus set the context of the present invention in terms of the overall system utilized to destroy odorous or pollutant materials, and having provided a listing of some of the representative pollutant materials commonly encountered, the following discussion will be entirely in terms of the Co(III)/sulfuric acid system, and will deal with counter-current scrubbing of a waste gas stream from a rendering plant.

The apparatus discussed in the following material basically comprises:

1. acid stream/waste stream contact means;
2. acid stream regeneration means (for the electrolytically regenerable cobalt oxidizing agent); with optional features including
3. a prefilter to remove solid materials from the waste stream;
4. demisting apparatus to remove acid "carryover" in the waste stream after contacting.

Cobalt can be added to the acid stream in any form which dissolves in water to give cobalt in ionic form such as, cobalt sulfate, cobalt acetate, cobalt perchlorate etc., or can be added in any form which reacts with sulfuric acid at the concentrations employed to produce cobalt in ionic form, such as, cobalt carbonate, cobalt stearate, cobalt oxide, or even in the form of cobalt metal. One would preferably avoid cobalt halides because of the oxidation of the halide ion which would produce a temporary flow of objectionable gases. Certain less common forms of cobalt are also known which would enter into objectionable reactions with the acid solution, but such materials will be easily apparent to one skilled in the art.

Having formed the cobalt (III)/acid stream, the first primary step of the present invention is, of course, to contact the cobalt (III) acid stream and the waste stream so that adequate mass transfer can occur to provide good interior oxidation, and so that heterogeneous oxidation can also occur. This can be done by any means which will insure a large surface area of the acid stream so that the gas stream can be adequately contacted therewith. The principles of mass transfer and gas/liquid interchange are so well known to the art that no further discussion need be provided at this point other than to indicate that it is, of course, most desirable to obtain maximum mass transfer.

In any case, oxidation of pollutant impurities from the gas stream will begin in the contact area. This oxidation will continue, for those materials which are not immediately oxidized, throughout the contact zone, in the regeneration cell, and in the lines used to return the regenerated Co(III) solution to the contact zone. In simplest terminology, oxidation of materials occurs throughout the complete "loop" of the process of this invention.

Typically, the waste stream/acid stream are contacted in a packed bed where the light acid stream trickles over the packing with the waste stream being blown through the packed bed. Oxidation begins to occur immediately upon contact of the waste stream and the acid stream. The Co(III) concentration is at a maximum immediately after electrolytic regeneration. The Co(III) concentration will continually decrease from a point immediately after electrolytic regeneration, and will thus reach a minimum concentration in the system immediately prior to regeneration. This will be at some point after the contact zone in the liquid flow path.

It is of substantially no importance where Co(III) regeneration occurs in the system. In the example to this application, Co(III) is regenerated immediately after the acid stream passes through the contact zone. Such regeneration could occur immediately prior to the contact zone with equally good results being obtained. The only reason for regeneration immediately after passing the contact zone is that a vertically extending packed bed has been utilized, and it is simpler to maintain the regeneration cell at ground level which is, of course, immediately after the vertical descent of the acid stream through the contact bed.

It will be apparent to one skilled in the art that, if desired, regeneration could actually occur in the interior of the contact bed by providing appropriate regeneration means in the contact bed. However, it is much simpler at times of process shutdown to maintain the contact bed and the regeneration cell separate. It will further be obvious that the required electrical connections are much easier made when the electrolytic cell is maintained separate from the contact area. This is a matter of tactical engineering, and is not imposed by the requirements of the process.

In any case, during regeneration the amount of Co(III) required to oxidize the pollutant impurities in the waste stream is produced from the elevated amounts of Co(II) present in the acid stream prior to regeneration and the Co(III) is cycled to the contact bed.

The following discussion will deal with some of the practical aspects of oxidation in the system of this invention where a packed bed contact area is used.

Typically, the Co(III)/acid stream is sprayed over the contact area which preferably comprises packing of any normal type which is resistant to the Co(III) and sulfuric acid.

Obviously, the rate of production of Co(III) in the acid stream must be correllated with the volume of the waste gas stream and the pollution load, i.e., the oxidizable impurities in the waste stream. The factors to be considered have been heretofore set forth in great detail.

Operation can theoretically be at a temperature just above the freezing point of the acid stream to the boiling point of the acid stream. However, for practical treatment levels with the Co(III) system, a temperature range of about 32°–130° F forms a preferred operational range. As heretofore indicated, one of the primary advantages of the present invention is that it permits highly efficient destruction of pollutant materials to be conducted at room temperatures.

The pressure of operation is of no importance, but it is generally atmospheric to avoid the more complicated equipment required for sub or super atmospheric operation.

In the following discussion, the primary criteria which the electrolytic regeneration cell must meet is that it must permit Co(III) to be produced at a rate sufficient to destroy the pollutant impurities in the waste stream. As long as this requirement can be met, any electrolytic regeneration apparatus can be used. Needless to say, generally one would "over design" the electrolytic regeneration cell since the main expenses of electrolytic regeneration will, in the long term, be due to the cost of electrical energy. However, if the cell is "over designed," one thus inherently provides in the system the capability to handle greater pollution loads and greater volumes of the waste stream.

The following discussion will enable one to form electrolytic regeneration apparatus useful in the present invention. While many materials can be used, applicants have found certain preferred materials which, for the systems under consideration, permit long term operation to be continued without the necessity for process shut down due to the extreme reactiveness of the Co(III)/acid stream. Applicants specifically do not wish to be limited to the materials disclosed, as it will be obvious that equivalents exist to the materials disclosed below. However, balancing cost and reliability, the following provides a simple and yet highly efficient electrolytic regeneration means.

The use of an electrolytic regeneration apparatus has been found to be a practical necessity for two reasons. First, regeneration is rapid and efficient. Second, some destruction of odorous or pollutant materials will actually occur at the electrodes of the regeneration cell. In addition, electrolytic regeneration is relatively inexpensive, does not require the addition of external chemicals, permits cell operation at ambient temperatures and provides a simplified means for a continuous pollution control cycle to be established with improved destruction of pollutants. The following material will deal with the electrolytic regeneration of the aqueous acid regenerable metal oxidizing agent stream.

It has been found that for the Co(III)/sulfuric acid system, few of the common electrode materials used by the prior art in electrolytic cells are efficiently operable for long term operation. The most preferred anode/cathode materials for regenerating a Co(III)/sulfuric acid system are lead dioxide/lead.

In the cathode of such a cell, Co(III) will accept an electron and will be converted to Co(II). Since the competing reaction at the anode of Co(II) to Co(III) and an electron also occurs, the reaction of Co(III) to Co(II) must be restrained, for instance, by making the anode area much greater than the cathode area. For example, a ratio of 20:1 can be utilized. Since the main purpose of using an anode area greater than the cathode area is to lower the degree of the conversion of Co(III) back to Co(II), it will be apparent to one skilled in the art that other anode/cathode area ratios can be utilized and, in fact, in some instances will be more advisable where one desires to increase the overall coulombic efficiency of the cell at a slight sacrifice with respect to the amount of Co(II) converted to Co(III). The concept of using a variable anode/cathode area ratio to favor a certain reaction (that occurring at the anode) is extremely well known to the art.

Many materials were tested to find acceptable electrodes. For the cathode, all metals except uncoated copper were found to work well for various periods of time. For instance, nickel, nickel alloys, copper (as long as totally immersed in the acid stream), lead coated copper, aluminum, titanium, 304 stainless steel, and tantalum were all found to be operable. However, platinum coated titanium and lead performed well for greatly extended periods of time and are therefore most preferred.

The problem of equipment life was more pronounced in the selection of the anode materials. Tantalum, tungsten and titanium could not be used as the anode at all because of rapid passification and current blockage. Molybdenum deteriorated as an anode. Copper, even lead coated, disintegrated. Only lead and platinum coated titanium performed well for long periods of time as the anode. Thus, lead and platinum coated titanium are the most preferred materials for constructing the anode of the electrolytic cell of this invention. Of the two, lead is preferred because of the lower cost thereof. However, it will be apparent to one skilled in the art that other anode materials can be utilized and such can be determined easily for the individual system under consideration to obtain optimum results upon a consideration of the time of operation and the cost of the materials used to form the electrolytic cell.

In the preferred form, where the anode member is initially lead, a rapid coating of lead dioxide forms on the anode. For some reason, the anode does not function in the system until this lead dioxide coating forms. Thus, in the preferred electrode assembly of this invention, it is postulated that lead dioxide forms as a thin layer on the lead anode and acts as a protective film to stop the conversion of elemental lead to Pb(II).

Any standard state of the art interconnecting elements can be used for the cell so long as they are resistant to the acid stream being treated. A number of materials have been discussed above, and additional materials which can be used will be apparent to one skilled in the art, for instance, a resin coated copper has been found to be excellently suitable for connecting the anodes and cathodes to the necessary power lines.

The primary factors to consider in the design and operation of a cell for a particular pollution control system are: (1) the volume of the waste gas stream treated; and (2) the "pollution load" in the waste stream. Important factors to consider with respect to the operation of the cell per se are: (1) adequate circulation; (2) acid concentration; (3) temperature of operation of the cell; (4) the rate of Co(III) regeneration required.

Secondary factors to consider are: (1) the anode/cathode area ratio; (2) the anode and cathode current densities.

It is obvious that the design of the cell, i.e., size, must be correllated to the waste stream volume and pollution or odor load since these determine the total amount of Co(III) required. For instance, applying the above factors, a 2,000 CFM waste stream from a rendering plant with a 30 ppm pollution load, i.e., oxidizable impurities, will require a minimum of $1.4 \times 10^{-2}$ M/min of Co(III) regeneration. The cell construction for this condition is set out in the Example.

The exact structure of form of the anodes and cathodes is not important. For instance, the anodes and cathodes can be suspended sheets formed of the selected materials, the anode could be a tubular shape surrounding a tubular cathode, the anodes and cathodes could be in the shape of grids or meshes, can be solid, can be partially meshed and partially solid, etc. The exact construction of a cell to permit the electrolytic regeneration of a material from a lower valence state to a higher valence state will be obvious to one skilled in the art and, quite often, can be varied greatly depending upon the exact conditions imposed. For instance, in treating a high volume pollution load, one may wish to use a plurality of cells in succession for potential ease of bypassing a single cell to avoid process shutdown. On the other hand, where cost is a factor, and operation is at a lower volume, one may wish to use one larger cell to avoid the expense of individual cells.

In fact, any cell construction can be utilized in the present invention if the materials of construction are resistant to the acid stream, and if the construction of the cell permits good circulation. Good circulation is, of course, required to permit adequate contacting of cobalt (II) with the electrodes so that Co(III) can be generated.

As heretofore indicated, sulfuric acid at a strength greater than 27.5N does not permit the passage of electrical current. Hence, this is an upper limit for electrolytic regeneration. The lower limit is a pH of 1, set by the fact that Co(III) does not exist in solution at a pH greater than 1. A most preferred acid concentration range for electrolytic regeneration is 10N–14N because of the preferred "humectant" effect in this range.

From the above discussion, it will be apparent that an infinite number of variations can be used to construct the electrolytic regeneration cell of this invention as long as sufficient Co(III) can be produced to destroy the pollutants in the waste stream. The anode/cathode area is of little importance as long as the Co(II) production is repressed with respect to the Co(III) production.

As a general rule, one desires to operate the cell at a good coulombic efficiency, that is, one desires to obtain the maximum Co(III) for the minimum electrical input. To produce $1.4 \times 10^{-2}$ moles/minute of Co(III), anode areas of 27,000–38,000 square centimeters in combination with an anode/cathode area of 20:1 have been used. The total cell current was 300 amps at 3.2 volts. The variation in the coulombic efficiency throughout this range is insignficant. At this production rate, an anode current density of $0.8 \times 10^{-2}$ to $1.1 \times 10^{-2}$ amps/sq. centimeter and a cathode current density of 0.264 amps/ sq. centimeter permits excellent regeneration. Lower or higher values can be used and these variations are well within the ambit of one skilled in the art, and will be apparent upon the application of everyday design principles used in electrolytic cells.

As heretofore indicated, the primary purpose of the cell is to convert Co(II) to Co(III). However, it has suprisingly been found that oxidation of pollutants occurs to some extent at the immediate vicinity of the cell electrodes.

Transient species such as $S_2O_8^=$ and $H_2O_2$ are produced at the electrodes. These materials actually serve to oxidize compounds such as butylamine, acetone, methanol, acetic acid, etc. For the first three compounds recited, the rate of oxidation will be several orders of magnitude slower than the corresponding reactions with the Co(III) solution. This is probably due to the much smaller concentration of reactants in addition to the fact that the Co(III) ion is a more powerful oxidant than any produced at the anode. However, for the latter compound recited, the relative rate of solution and electrode oxidation may become competitive.

The above material describes the essential components of the electrolytic regeneration apparatus of the present invention.

Having thus discussed the regeneration cell of the present invention, it is appropriate to turn to several preferred features relating to the process of the present invention.

Where a waste stream is to be treated which has a high solids content, such as "bone meal" from a rendering plant or the like, it is preferred to have some type of prefilter which cleanses the waste stream of solid particulate matter prior to its entering the contact bed. This could be any type of mesh screen or like apparatus such as an electronic precipitator, acid wash, etc.

The actual packed bed can be any material which insures intimate gas/liquid contact, and which is fairly inert to the reactants. For instance, materials such as polypropylene, polyethylene or ceramic packings, in such forms as Beryl saddles, Pall rings or Raschig rings can be used. A packed bed has proven to be generally the simplest to use in the process of the present invention. However, the present process is not limited to packed beds. For instance, in addition to countercurrent packed beds, cross flow packed beds, combined packed beds -spray units, co-current packed beds, parallel flow packed beds, wet centrifugal scrubbers, baffled spray tower apparatus, open spray tower apparatus, orifice scrubbers, ejector venturi and the like could be used as substantial equivalents.

After contact, where the Co(III)/sulfuric acid system is sprayed over the packing, some spray or mist droplets may be entrained in the cleansed waste stream. To avoid having such highly corrosive materials transferred to the atmosphere or the like, any suitable demisting apparatus may be used to remove substantially all of the sulfuric acid carried over as a mist or spray.

Thus, in a preferred embodiment of this invention, in an environment where much particulate material is encountered, the incoming waste gas is filtered to remove particulate materials, contacted with the Co(III)/sulfuric acid solution, demisted and passed to the atmosphere.

With reference to the drawing, apparatus for use in one embodiment of the practice of the process of this invention is schematically shown. The waste stream initially enters via conduit 1, passes through prefilter 2, and into the contact bed 3 which is packed with any appropriate packing 4. The Co(III)/ sulfuric acid solution is introduced into the contact bed 4 from spray head 5 via conduit 6, where the Co(III)/sulfuric acid solution contacts the up-flowing waste stream.

"Spent" Co(III)/sulfuric acid containing higher amounts of Co(II) is continuously withdrawn via line 7 and forwarded to electrolytic cell 8 wherein the solution is regenerated. Regenerated solution is continuously returned to the spray head 5 above the contact bed 4 via conduit 6.

The waste stream, after treatment, is passed through demisting apparatus 9 and moved via line 10 for venting to theatmosphere or return to the interior of a dwelling or the like. Power supply means 11 for cell 8 is also provided.

Figure 2:
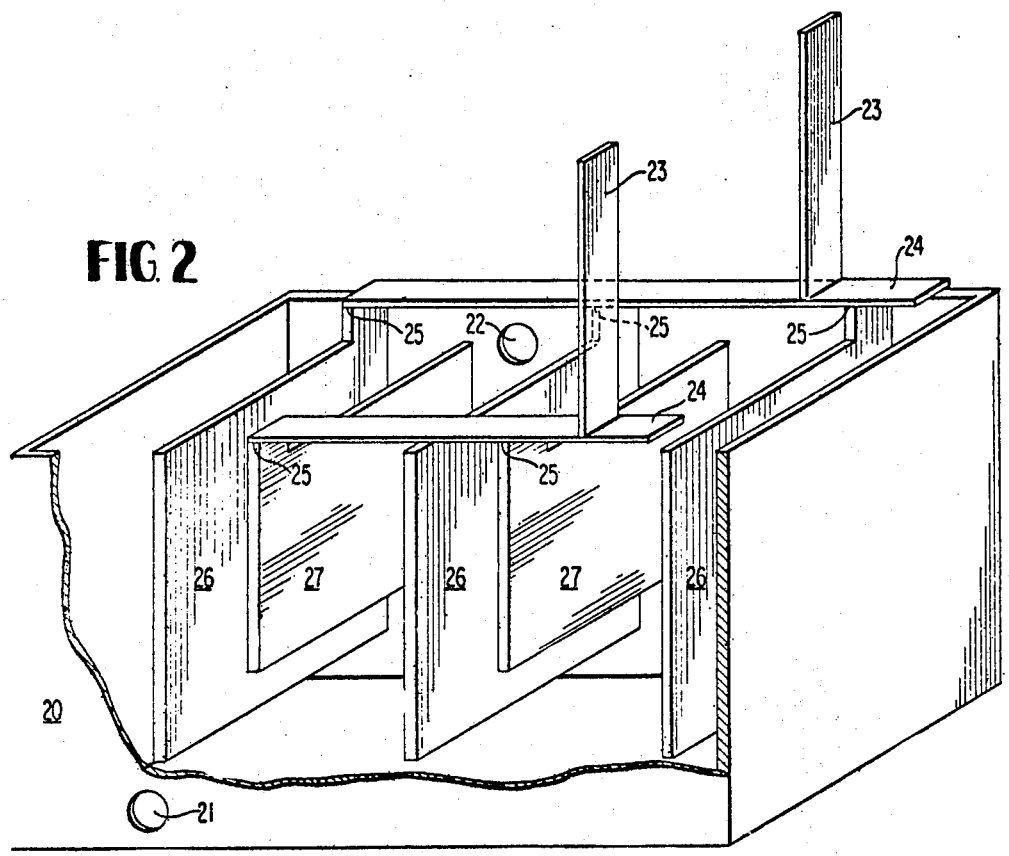
FIG. 2 is a perspective view of electrolytic regeneration apparatus useful in the present invention.

Turning now to FIG. 2, there is shown therein a perspective view of an electrolytic regeneration cell useful in the present invention. The electrolytic regeneration apparatus comprises casing 20 which is provided with entrance port 21 and exit port 22 for the aqueous acid stream before and after regeneration, respectively. Vertically extending support members 23 are shown in combination with horizontally extending support members 24. Separate support assemblies are provided for the anodes and cathodes. Depending from the horizontally extending support members 24 in a downward direction are the anodes 26 and the cathodes 27 soldered into the horizontally extending support members 24 by 50/50 lead/tin solder 25.

A cell as shown was used in the example.

The casing 20 can be formed of any suitable material, such as lead, members 23 and 24 are polyvinyl chloride coated copper, and members 26 and 27 are initially lead.

The following specific example is provided to further amplify the above description of the invention.

EXAMPLE 1

The waste stream treated in the present example flowed through the treating process at a rate of 2,000 CFM, was obtained at initial temperatures of between 80° to 100° f., and contained approximately 30 ppm of odorous pollutants comprised primarily of amines, aldehydes, ketones, organic acids, esters and amino acids. The waste stream was removed from the interior of a rendering plant.

Initially, as a high solids content was encountered, the waste stream was passed through a mesh prefilter wherein much of the particulate solids was removed from the waste stream.

The contact apparatus per se comprised a glass reinforced polyester resin cylinder with an inner diameter of 30 inches containing a 5 foot deep packed bed of polypropylene packing. The waste stream, after prefiltering, was injected into the bottom of the contact tower, passed through a supporting mesh which supports the packing, and was passed in countercurrent flow with a downflowing Co(III)/sulfuric acid stream. In this example, the temperature of operation was ambient, roughly 80° to 110° F. and operation was at atmospheric pressure. Over the contact bed, for a 2,000 CFM waste stream, approximately 17 gallons total Co-(III)/sulfuric acid solution was downflowed per minute, containing a total cobalt concentration of 0.1M carried in approximately 45 percent acid. Approximately 10 percent of the total cobalt content was Co(III). The Co(III)/acid solution was introduced into the packing from a spray nozzle over the packing. The residence time in the packed area was approximately 1 second. The waste gas exited from the packed bed, was passed through a demister to reduce the sulfuric acid concentration to 0.05 ppm and vented to the atmosphere. Substantially all materials in the waste stream were converted to carbon dioxide and water and vented to the atmosphere with the waste stream. The Co(III)/sulfuric acid solution is removed from the contact bed and passed to electrolytic regeneration apparatus.

The electrolytic regeneration apparatus utilized comprised lead dioxide anodes and lead cathodes supported from a PVC coated copper support bar, and joined thereto by a 50–50 lead/tin solder. An anode area of 27,000 – 38,000 square centimeters was used in combination with an anode/cathode ratio of 20:1. An anode current density of $0.8 \times 10^{-2}$ to $1.1 \times 10^{-}$amps/cm$^2$ and a cathode current density of 0.264 amps/cm$^2$ was provided by a power supply of 300 amps. Regeneration was continuous. The Co(III)/sulfuric acid solution leaving the electrolytic regeneration cell was returned to the contact bed apparatus and again sprayed over the packing for oxidation of further odorous materials.

The apparatus operated at an odor removal efficiency of about 90 percent.

While the invention has been particularly shown and described with reference to preferred embodiments thereof, it will be understood by those skilled in the art that various changes in form and details may be made therein without departing from the spirit and scope of the invention.

What is claimed is:

1. A continuous process for destroying oxidizable odorous and pollutant impurities carried in a gas stream comprising:

contacting said gas stream in mass transfer relationship with an aqueous acid stream containing at least one electrolytically regenerable ionic oxidizing agent selected from the group consisting of cobalt, chromium, manganese, cerium, and silver in ionic form to transfer oxidizable impurities from said gas stream to said aqueous acid stream and to destroy oxidizable impurities by the action of said electrolytically regenerable ionic oxidizing agent, thus reducing the oxidizing capacity of said ionic oxidizing agent by decreasing the valence state thereof, electrolytically regenerating said ionic oxidizing agent to a valence state higher than said decreased valence state while contained in said aqueous acid stream to restore the capacity of the electrolytically regenerable ionic oxidizing agent to destroy further pollutant impurities, and utilizing said aqueous acid stream containing the thus electrolytically regenerated ionic oxidizing agent to contact additional oxidizable odorous and pullutant impurities carried in a gas stream.

2. The process of claim 1 further comprising separating said aqueous acid stream from said gas stream after said contacting and prior to said electrolytic regenration.

3. The process of claim 2 further comprising recycling said aqueous acid stream after said electroyltic regeneration for further contacting with said gas stream.

4. The process of claim 2 wherein said electrolytically regenerable oxidizing agent is cobalt in ionic form and said aqueous acid stream is rendered acidic by the inclusion therein of a mineral acid selected from the group consisting of sulfuric acid, phosphoric acid, perchloric acid, water soluble acid salts derived therefrom and mixtures thereof.

5. The process of claim 1 wherein the electrolytically regenerable oxidizing agent is chromium in ionic form.

6. The process of claim 1 wherein the electrolytically regenerable oxidizing agent is manganese in ionic form.

7. The process of claim 1 wherein the electrolytically regenerable oxidizing agent is cerium in ionic form.

8. The process of claim 1 wherein said oxidizable impurities are destroyed by said electrolytically regenerable oxidizing agent at a rate at least equal to the rate at which said oxidizable impurites are transferred into said aqueous acid stream.

9. The process of claim 1 wherein said aqueous acid stream contains oxidizable impurities after said contacting and at least a portion of said oxidizable impurities are destroyed during said electrolytic regeneration as a result of an electric current passed through said aqueous acid stream to regenerate said electrolytically regenerable oxidizing agent.

10. The process of claim 1 wherein the temperature of said gas stream is substantially equal to the temperature of said aqueous acid stream.

11. The process of claim 10 wherein the temperature of said aqueous acid stream is from about 32° to about 130° F.

12. The process of claim 1 wherein said aqueous acid stream is at a pH less than 1 and a normality less than about 27.5.

13. The process of claim 12 wherein said aqueous acid stream is rendered acid by the inclusion therein of a member selected from the group consisting of mineral acids, water soluble acid salts derived from said mineral acids and mixtures thereof.

14. The process of claim 13 wherein said mineral acid is selected from the group consisting of sulfuric acid, phosphoric acid, perchloric acid and mixtures thereof.

15. The process of claim 1 wherein the aqueous acid stream comprises perchloric acid.

16. The process of claim 1 wherein the aqueous acid stream comprises sulphuric acid, phosphoric acid and perchloric acid.

17. The process of claim 2, wherein said aqueous acid stream is at a pH less than 1 and has a normality less than 27.5, and said aqueous acid stream is rendered acid by the inclusion therein of a member selected from the group consisting of mineral acids, water soluble acid salts derived therefrom, and mixtures thereof.

18. The process of claim 17 wherein said electrolytically regenerable oxidizing agent is cobalt in ionic form and said acid stream is rendered acidic by the inclusion therein, of a member selected from the group consisting of sulfuric acid, water soluble acid salts derived therefrom and mixtures thereof.

19. The process of claim 1 wherein said electrolytically regenerable oxidizing agent is cobalt in ionic form.

20. The process of claim 1 wherein both organic and inorganic odorous and pollutant impurities are destroyed.

21. The process of claim 20 where only organic odorous and pollutant impurities are destroyed.

22. The process of claim 20 wehre only inorganic odorous and pollutant impurities are destroyed.

23. The process of claim 1 wherein:
the aqueous acid stream is separated from the gas stream after the contacting but prior to subjecting the aqueous acid stream to electrolytic regeneration, whereby a portion of the odorous and pollutant impurities are destroyed, the remainder of the odorous and pollutant impurities carried in the aqueous acid stream being recycled in said aqueous acid stream to contact incoming gas stream containing incoming odorous and pollutant impurities, the remainder of the odorous and pollutant impurities being in a state of dynamic equilibrium with the incoming odorous and pollutant impurities prior to, during and after passage of the electrical current rhough the aqueous acid stream.

24. The process of claim 23 wherein said odorous and pollutant impurities comprise water soluble impurities which are dissolved to yield a negatively and positively charged species, the negatively charged species being subjected to electrical migration during the electrolytic regeneration and being in part anodically destroyed and the positively charged species also being subjected to migration during the electrolytic regeneration and being in part cathodically destroyed.

25. The process of claim 24 wherein the odorous and pollutant impurities further comprise water insoluble impurities which are destroyed by transient species generated during the passage of electrical current through the aqueous stream.

26. A continuous process for destroying oxidizable odorous and pollutant impurities carried in a gas stream comprising:
contacting said gas stream in mass transfer relationship with an aqueous acid stream containing cobalt (III) to transfer oxidizable impurities from said gas stream to said aqueous acid stream and to destroy oxidizable impurities by said cobalt (III) thereby converting the cobalt (III) to cobalt (II) thus reducing its capacity to oxidize further oxidizable impurities, said acid stream being rendered acidic by the inclusion therein of a member selected from the group consisting of sulfuric acid, water soluble acid salts derived therefrom, and mixtures thereof;
electrolytically regenerating cobalt (II) to cobalt (III) while carried in said aqueous acid stream to restore the capacity of said aqueous acid stream to oxidize further pollutant impurities; and
utilizing said regenerated aqueous acid stream containing regenerated Co(III) to contact additional oxidizable odorous and pollutant impurities carried in a gas stream.

27. The process of claim 26 further comprising separating said aqueous acid stream from said gas stream after said contacting and prior to said electrolytic regeneration.

28. The process of claim 27 further comprising recycling said aqueous acid stream after said electrolytic regeneration for further contacting with said gas stream.

29. The process of claim 28 wherein said aqueous acid stream is at a pH less than 1 and a normality less than about 27.5.

30. The process of claim 29 wherein said aqueous acid stream is rendered acid by the inclusion therein of sulfuric acid.

31. The process of claim 30 wherein the amount of cobalt in said aqueous acid stream is above 0.002 M.

32. The process of claim 31 wherein from about 5 to 20 percent of said cobalt, on a molar basis, is Co(III), the balance being Co(II).

33. The process of claim 32 wherein the amount of cobalt in said aqueous acid stream is above 0.005 M and less than the saturation point of cobalt.

34. The process of claim 33 wherein contacting, regenerating and recycling are conducted at substantially the temperature of the gas stream.

35. The process of claim 26 wherein said oxidizable impurities are destroyed by the Co(III) at a rate at least equal to the rate at which said oxidizable impurities are transferred into said aqueous acid stream.

36. The process of claim 26 wherein said aqueous acid stream contains oxidizable impurities after said contacting and at least a portion of said oxidizable impurites are destroyed during said electrolytic regeneration as a result of the electric current passed through said aqueous acid stream to regenerate the cobalt (II) to cobalt (III).

37. The process of claim 26 wherein the temperature of said aqueous acid stream is from about 32° to about 130° F.

38. The process of claim 26 wherein the cobalt is used in combination with a different multi-valence electrolytically regenerable ionic oxidizing agent selected from the group consisting of a metal other than cobalt in ionic form and a mixture of metals other than cobalt in ionic form.

* * * * *